United States Patent [19]

Spanner

[11] 3,744,257
[45] July 10, 1973

[54] WATER-SURFACE CLEANSING SHIP

[76] Inventor: William Frank Spanner, 4, Albion Terrace, The Common, Patchway, Bristol BS12 6AN, Gloucestershire, England

[22] Filed: Dec. 1, 1971

[21] Appl. No.: 203,786

[52] U.S. Cl. .................. 61/46.5, 61/63, 114/.5 R, 210/DIG. 21, 210/242
[51] Int. Cl. .................. E02b 17/00, E02b 15/04
[58] Field of Search .............. 210/83, 242, DIG. 21, 210/156; 162/DIG. 1; 114/.5 R; 61/46.5, 63

[56] References Cited
UNITED STATES PATENTS

| | | | |
|---|---|---|---|
| 2,330,508 | 9/1943 | McColl | 210/242 |
| 3,314,540 | 4/1967 | Lane | 210/DIG. 21 |
| 2,435,467 | 2/1948 | Spencer | 162/DIG. 1 |
| 973,697 | 10/1910 | Potts | 210/156 X |
| 3,608,727 | 9/1971 | Glutsch | 210/DIG. 21 |
| 3,532,622 | 10/1970 | McNeely | 210/DIG. 21 |
| 3,617,555 | 11/1971 | Ginsburgh | 210/DIG. 21 |

FOREIGN PATENTS OR APPLICATIONS

| | | | |
|---|---|---|---|
| 947,026 | 1/1964 | Great Britain | 210/242 |
| 1,131,513 | 10/1968 | Great Britain | 210/DIG. 21 |
| 1,206,794 | 10/1967 | Great Britain | 210/DIG. 21 |
| 1,177,776 | 8/1967 | Great Britain | 210/DIG. 21 |

OTHER PUBLICATIONS

Ocean Industry, August, 1970, Vol. 5, No. 8, Gulf Publishing Co., Houston, Texas, page 40.
Ocean Industry, June 1970, Vol. 5, No. 6, Gulf Publishing Co., Houston, Texas, page 51.

Primary Examiner—Samih N. Zaharna
Assistant Examiner—T. A. Granger
Attorney—Eric H. Waters et al.

[57] ABSTRACT

A water-surface cleansing ship having a hull provided with a channel extending longitudinally through the hull. At least surface water to be cleansed is caused to flow in operation of the ship, through the channel, by motion of the ship either self-propelled or towed and/or by flow causing means such as a paddle wheel in the channel. The ship has means for removing and recovering contaminants such as oil from water flowing through the channel. The contaminant removing and recovering means preferably include a mesh grill, one or more conveyor belt and tank assemblies, and detergent sprays.

10 Claims, 4 Drawing Figures

WATER-SURFACE CLEANSING SHIP

BACKGROUND OF THE INVENTION

The present invention relates to a cleansing of at least the surface regions of bodies of sea or fresh water and concerns in particular the provision of a ship for effecting such cleansing.

The prevention of pollution of the sea and rivers by contaminants such as oil has become of increasing importance, and there have been repeated accidents in which large quantities of crude petroleum have been let loose on the surface of the ocean with serious results in terms of the damage and pollution caused apart from the loss of valuable raw material. Present methods of dealing with waterborne contaminants such as oil are both costly and inefficient and do nothing to recover the large quantities of oil and other contaminants lost.

SUMMARY OF THE INVENTION

Accordingly it is the primary objective of the invention to provide a water-surface cleansing ship for removing the recovering contaminants such as oil from at least the surface region of bodies of water in an efficient and relatively inexpensive manner.

In order to implement these and still further objects of the invention which will become more readily apparent as the description proceeds, the inventive water-surface cleansing ship has a hull provided with a longitudinally extending channel through which channel at least surface water to be cleansed can be caused to flow, when the ship is floating in said water, and means for removing and recovering contaminants such as oil from the water when flowing through said channel.

BRIEF DESCRIPTION OF THE DRAWINGS

The invention will be better understood and objects other than set forth above, will become apparent, when consideration is given to the following detailed description thereof. Such description makes reference to the annexed drawings wherein.

DETAILED DESCRIPTION OF PREFERRED EMBODIMENTS

Figure 1:
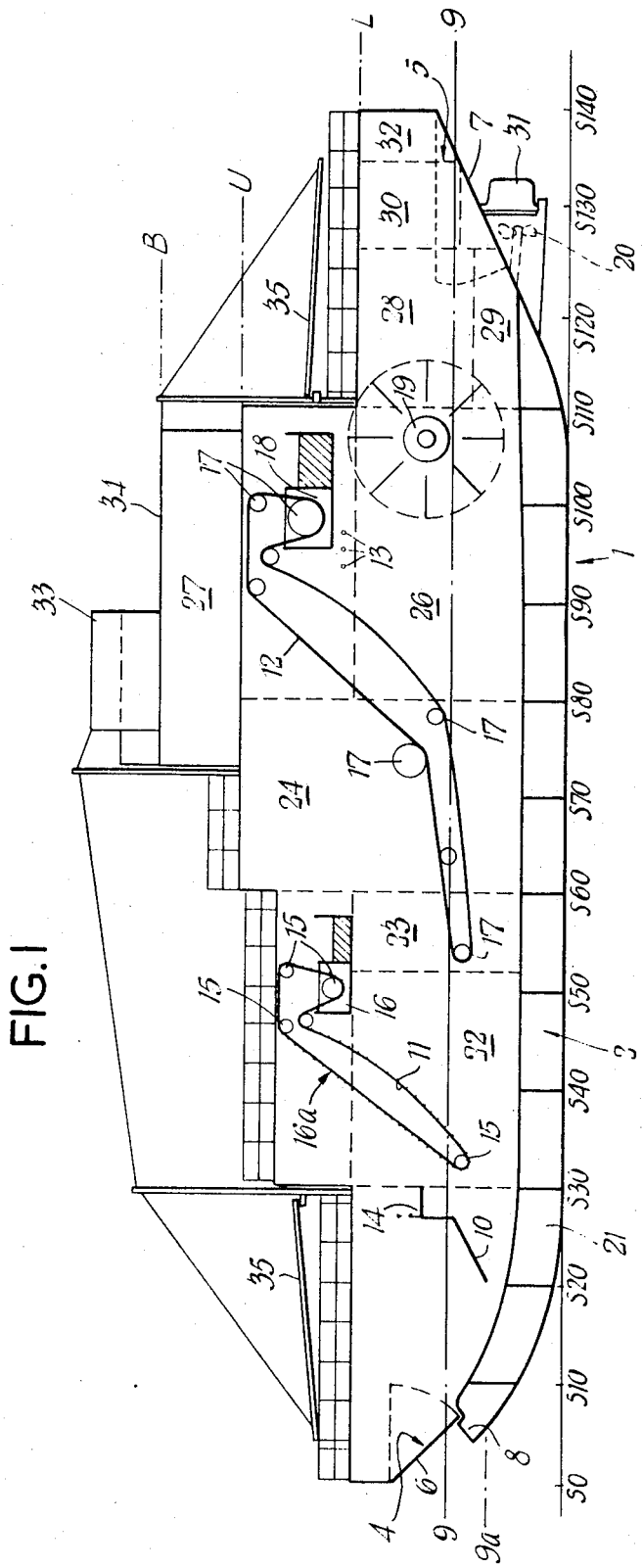
FIG. 1 is a diagrammatic side view, partly in section, of one embodiment of a water-surface cleansing ship of the invention.
Figure 4:
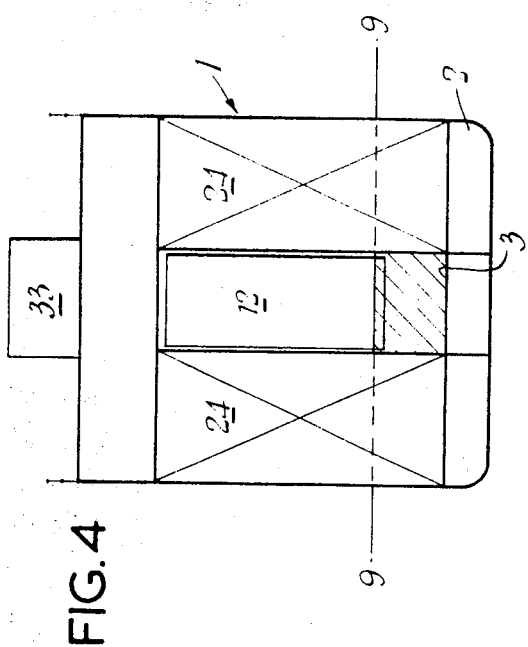
FIG. 4 is a diagrammtic sectional view taken on the line IV — IV of FIG. 2.

A water-surface cleansing ship according to the invention basically has a hull provided with a longitudinally extending channel through which channel at least surface water to be cleansed can be caused to flow, when the ship is floating in said water, and means for removing and recovering contaminants such as oil from the water when flowing through said channel.

One embodiment of the invention is illustrated in FIGS. 1 to 4 of the drawings which show a water-surface cleansing ship intended mainly for recovering oil from water. The ship has a hull generally indicated at 1 which is roughly in the form of a rectangular box structure faired at the ends and of generally U-shaped cross-section. A double bottom 2 extends over the full width of the hull 1 from station S 4 to station S110.

A channel 3 of generally rectangular cross-section extends longitudinally through the hull 1, preferably along the center-line thereof from an opening 4 at the ship's bow to an opening 5 at the stern. Hinged flap means 6 and 7, able to be secured watertight, are1provided on the hull 1, with the flap means 6 at the bow opening 4 and the flap means 7 at the stern opening 5.

In the embodiment illustrated, the channel 3 is bounded below by a rounded sill 8 at station S8 conveniently 18 inches below the designed water-line 9 on the center line of the hull 1, and on each side by the main structure of the ship over a width of 35 feet 11¼ inches. The channel 3 diminishes in width to 10 feet at station S30 and thereafter is of constant width. The depth of the channel 3 increases above 18 inches at the sill 8 at increasing distances aft so as to maintain an approximate area for the flow of water through the channel of about 60 square feet. The channel has a depth of 6 feet 6 inches at station S30, this depth being maintained constant as far aft as station S90, whereafter the depth diminishes to 6 feet at station S124. The 18 inch depth of sill at the bow is maintained for 5 feet on both sides of the center line station S8 and then increases uniformly on both sides to a maximum depth of 2 feet at the full width. It is of course to be understood that the foregoing dimensions are merely given by way of example and can be varied to suit particular design requirements.

Water to be cleansed is caused to flow into the channel 3 through the open bow flap means 6 and is treated whilst flowing through the channel to the open stern flap means 7, by means for removing and recovering contaminants. Basically the water may be caused to flow into the channel 3 by towing the ship bodily through the water. Additionally or alternatively the ship may be provided with means in the channel 3 for causing water to flow therethrough. Indeed the ship may be self propelled to cause water to flow through the channel 3 by ship movement, with or without the provision of flow causing means in the channel 3. As will be described in more detail hereinafter the ship illustrated in FIGS. 1 to 4 is self propelled and is provided with flow causing means in the channel 3.

The means for removing and recovering contaminants from water flowing through the channel 3 includes in the illustrated example a grill 10, a first conveyor belt 11 and a second conveyor belt 12. The grill 10 is in the form of a wire coarse mesh screen, preferably with 3 inch mesh size, portably mounted at stations S20 to S27 in the channel 3 near the bow opening 4 and extending well below the operating waterline 9. A platform or walkway 14 extends transversely of the hull above the grill 10 so that a seaman positioned thereon can remove large contaminants such as oil-soaked sea weed from the grill. A bin (not shown) can be provided for receiving such seaweed removed from the grill 10.

Aft of the grill 10 in the channel 3 is arranged the first conveyor belt 11 which is arranged to project at its forward end into water flowing through the channel 3. The belt 11 is preferably in the form of netting made of synthetic plastic material such as nylon of three-fourths inch mesh mounted on cross rods secured to roller chains which are preferably galvanized. The chains and belt 11 pass over sprockets and rollers such as 15 through a first residue tank 16 containing solvent and or washing medium such as hot water for removing tarry/oily lumps or masses over three-fourths inch in diameter from the belt 11. The belt 11 is provided with projections 16a to facilitate the removal of tarry/oily lumps of between 3 inch and ¾ inch diameter from the water in the channel 3. The belt 11 and tank 16 are portable for easy removal and cleansing, and drive means for the belt 11 is provided conveniently in the form of a 7½ horsepower 230 volt D.C. motor. A suitable operating speed for the belt 11 is 1 foot per second.

Aft of the first conveyor belt 11 in the channel 3 is arranged a second conveyor belt 12 which also is arranged to project at its forward end into water in the channel 3. The belt 12 is in the form of preferably galvanized chains connected by cross supports carrying trays or rods which in turn carry sponges made of plastic material. The chains and belt 12 pass over sprockets and rollers such as 17 through a second residue tank 18 containing solvent and/or washing medium such as hot water for removing lighter/heavier fractions of crude petroleum picked up from the water by the sponges. The oil initially sticks to the sponges whilst the water drains away and the oil is removed from the sponges in the tank 18. The belt 12 and accompanying apparatus is portable for easy removal and cleaning and the belt 12 is driven by electric drive means such as a 30 horsepower 230 volt D.C. motor through couplings and gearing at a suitable speed of for example 4 feet per second. If desired more than one such belt 12 may be provided.

Aft of the belt or belts 12 are arranged detergent spray pipes 13 operative to spray detergent on the water surface in the channel 3 to break up any residual oil slicks. These pipes 13 may be accompanied by net containers of absorbent pads (not shown) which are suspended into the water to recover oil traces or slicks.

Finally aft of the belt or belts 12 and pipes 13 in the channel 3 is arranged water flow causing means in the form of a paddle wheel 19. This paddle wheel 19 is operative to cause or assist water to flow through the channel 3 and to break up completely and disperse any residual oil slicks. The paddle wheel may also assist in the propulsion of the ship which in the main is effected by twin screws 20. Ballast and trimming tanks such as forward port and starboard trimming tanks 21 at stations S20 to S30 are provided for varying the draft of the ship so that in the water-surface cleansing condition the ship floats at the operating water-line 9 with flap means 6 and 7 open. In the ballast condition when proceeding to an area of operation, the flap means 6 and 7 are secured watertight and the ship floats at a light water line 9a. In this latter condition the speed of the ship is appreciably greater than in the water-surface cleansing condition.

In operation of the ship for water-surface cleansing, the ship is trimmed to a suitable draft to permit an adequate depth of water to be cleansed, including the water surface region, to enter the channel 3 through the open flap means 6 and 7. The paddlewheel 19 and/or screws 20 are operated to draw dirty water through the bow opening 4 firstly through the grill 10 which traps oil soaked masses of seaweed or other contaminants over 3 inches in diameter for removal from the grill by hand, then through the belt 11 which removes oily/tarry residues between 3 inches and three-fourths inch in diameter from the water and carries them into the tank 16 where they are recovered and saved. Any remaining lighter fractions of oil flow through the netting belt 11 to the belt 12 where the sponges pick up light fractions of oil and carry them into the tank 18 where they are recovered. Any slight traces of oil passing the belt 12 are dispersed by the detergent from the spray pipes 13 and the paddlewheel 19 if the nets containing absorbent pads are not employed or do not absorb all remaining oil traces. The cleansed water then exits from the channel 3 through the stern opening 5.

Above the level of the double bottoms 2 and within the side compartments formed in the hull 1 are accommodated, the two forward trimming tanks 21 at stations S20 to S30. Over these tanks 21 are port and starboard chain lockers at stations S20 to S26, and two stores compartments at stations S26 to S30. Also within the side compartments in the hull above the level of the double bottoms 2 are a main generator room 22 at stations S30 to S52 on the starboard side and a standby generator room and workshop on the port side both extending to the level L of the lower deck, there being two pump rooms 23 (port and starboard) at stations S52 to S60. The crews' accommodation extends port and starboard from station S30 to station S60 above the level of the lower deck, the two groups of cabins being connected by a passageway over the channel 3.

Two main oil/ballast/oily bilge/waste oil tanks 24 are constructed one port and one starboard with arrangements for separating oil from water and of capacity 170 tons S.W. each, 340 tons total port and starboard. Deck connections are to be provided one port and one starboard to receive oil waste from ships discharging contaminated bilge water.

A coffer dam 25 is provided for the full depth of the main oil tanks 24 port and starboard at stations S78 to S80. Two main engine rooms 26 extend to the level of the lower deck port and starboard between stations S80 and S110.

Above the level of the lower deck and extending to the level U of the upper deck are on the starboard side an auxiliary boiler room and laundry between stations S80 to S95 and a dredging pump room between stations S99 to S110. On the port side is a main switchboard and auxiliary generator room between stations S80 and S110. Above the level of the upper deck and across the full width of the ship is the galley, cook's, captain's and officers' accommodation 27 between stations S72½ and S107½. Below the level of the lower deck between stations S110 and S126 are a paddle wheel engine room 28 on the starboard side and the No. 2 dredging pump room on the port side. Beneath these two compartments are the stern tube compartments 29 port and starboard. Two steering engine compartments 30 lie between stations S126 and S135, with stern frames and stiffening below to carry two rudders 31, one port and one starboard. Tanks 32 are arranged, one port and one starboard between stations S135 and S140 fro detergent.

Portable plates securely bolted are fitted as necessary to enable all machinery to be removed and serviced. Manholes are fited to enable all closed compartments to be entered and watertight hatches and doors are fitted to enable stores and provisions to be shipped, and to provide access to compartments where officers and crew live and work, or which may require inspection during operations. Generally, the hull 1 is constructed to conform with the requirements of Lloyd's Register of Shipping.

Three diesel engines are provided each of 300 Brake horsepower at 1,500 revs/min, to drive through suitable M.W.D. reverse/reduction gearing in the case of the two screws 20, and suitable M.W.D. reduction gearing in the case of the paddle wheel 19. The diesel engines for the two screws 20, one port and one starboard are fitted in the main engine rooms 26 at stations S80 to S110 and are connected, through M.W.D. reverse/reduction oil operated gear boxes to the screw propeller shafts by suitable flexible couplings. The propeller shafts are provided with thrust blocks and are mounted in plummer blocks and at the after end of the stern tubes "Tufnol" or similar lined bearings.

The diesel engine for the paddle wheel 19 is fited in the paddle engine room 28 at stations S110 to S126 and connected, through a M.W.D. oil operated reduction gear box, to the paddle wheel 19 through a suitable flexible coupling and bevel reduction gear to give a suitable paddle wheel operating speed. Electrical generating machinery, switchboard, steering engines and pumps are installed in the designated compartments. All machinery is adequately protected and ventilated and generally conforms with the requirements of Lloyd's Register of Shipping.

Figure 3:
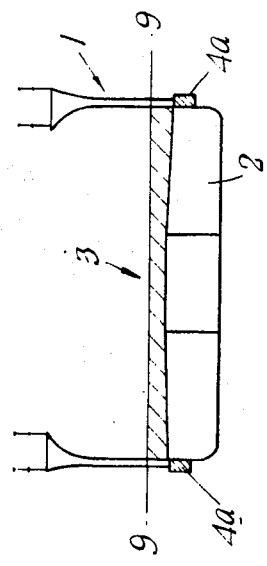
FIG. 3 is a diagrammatic sectional view taken on the line III — III of FIG. 2.
Figure 2:
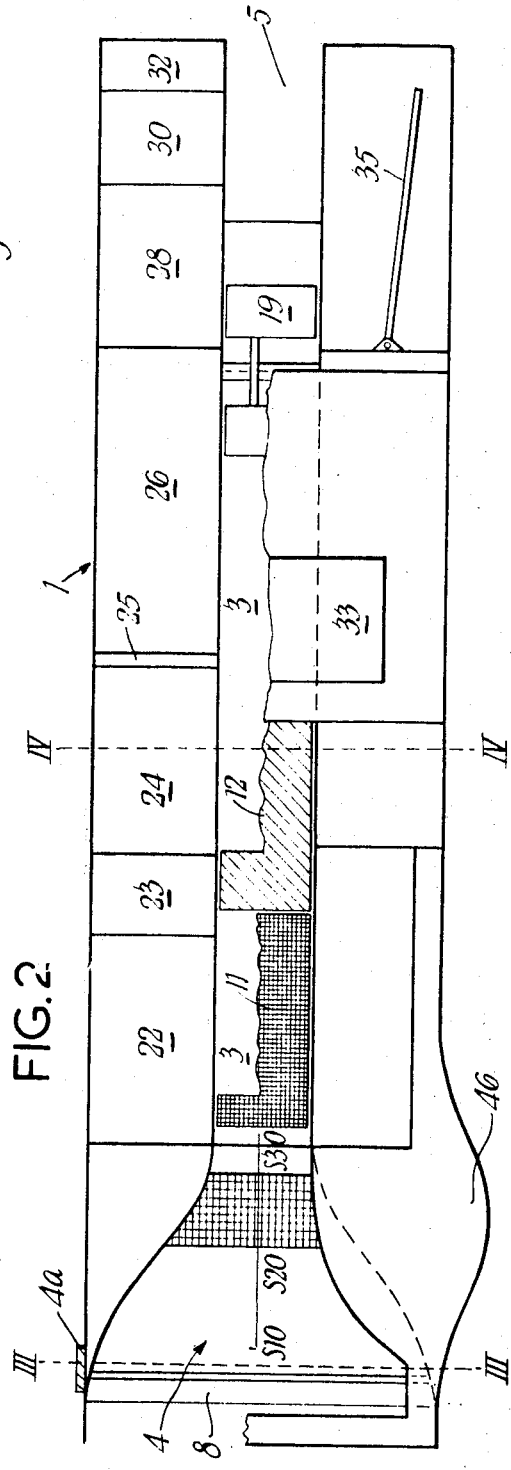
FIG. 2 is a diagrammatic plan view of the ship of FIG. 1, the upper or starboard part of FIG. 2 being a water line section plan view and the lower or port part of FIG. 2 being a true plan view from above.

As can be seen from FIGS. 2 and 3 the bow opening 4 is protected against impact damage, which would otherwise distort the opening and thereby prevent efficient sealing by the flap means 6, by wood blocks 4a and port and starboard bulges 4b on the fore end of the hull 1.

The ship may be provided with ancilliary equipment to enable dredging operations to be carried out in rock, shingle, sand or other types of seabed and/or river bed, salvage operations, harbor tender duties, oil/gas drilling rig servicing and fire extinguishing and fire-fighting. Furthermore a well may be constructed in the channel 3 and suitably positioned to enable divers, dredging equipment etc. to be lowered from the interior of the ship.

Boats and life saving equipment are provided together with radio and navaigation equipment. A chart house 33 and radio office are provided on the bridge deck B and a helicopter platform 34 is arranged on the bridge deck aft of the chart house 33. Derricks 35 are also provided.

An example of dimensions, weights, etc of a ship according to the invention such as shown in FIGS. 1 to 4 is as follows:

Example details of a Twin-Screw Oil Recovery/Surface Cleansing vessel and drilling rig tender with auxiliary dredging and salvage equipment

| | |
|---|---|
| Length overall | 140 feet. |
| Breadth (moulded) | 36 feet. |
| Breadth extreme | 46 feet. |
| Depth to lower deck | 22 feet. |
| Depth to upper deck | 34 feet. |
| Draft in oil recovery/surface cleansing operating condition | 12 feet. |
| Draft in ballast | 8 feet. |
| Speed | 8/10 knots. |
| Horsepower | 600 total on two screws. 300 on stern paddle wheel when an oil recovery/surface cleansing operations |
| Electric Supply | 1-150 K.W. 230 v.D.C. main Generator. |
| | 1-75 K.W. 230 v.D.C. Standby Generator. |
| | 1-30 K.W. 110 V.D.C. Auxiliary Generator. |
| Boiler | 1-Auxiliary boiler for heating purposes |
| Capacity | 500 tons for recovered petroleum products. |
| Lightship Tonnage | 600 tons. |

While there is shown and described present preferred embodiments of the invention, it is to be distinctly understood that the invention is not limited thereto but may be otherwise variously embodied and practiced within the scope of the following claims. Accordingly, I claim:

1. A water-surface cleansing ship comprising
   a. a hull,
   b. said hull having a longitudinal channel extending from an opening at the bow of the ship to an opening at the stern of the ship, through which channel at least surface water to be cleansed can be caused to flow when the ship is floating in the water,
   c. means for removing and recovering contaminants from the water when flowing through said channel, said means including
   d. a coarse mesh grill portably mounted in said channel near the bow opening and operative to remove large solid contaminants from the water passing therethrough,
   e. a first conveyor belt located aft of said grill, and drive means for said first conveyor belt, said first belt projecting into said channel to pick up and remove from water in the channel contaminants inclusive of oily tarry residues which have passed through said coarse mesh grill,
   f. a second conveyor belt located aft of the first conveyor belt, and drive means for said second conveyor belt, said second belt projecting into said channel to pick up and remove oil from water in the channel,
   g. and flow inducing means for causing water to flow through the channel including a paddle wheel mounted to project into the water in the channel, said paddle wheel being arranged with respect to the channel between the second conveyor and the stern opening.

2. A ship according to claim 1 including means for dispersing residual traces of contaminants in water in the channel comprising pipes for spraying detergent over water in the channel, said pipes being located with respect to the channel between the second conveyor belt and the paddle wheel.

3. A ship according to claim 1 wherein said first conveyor belt includes a covering of netting of plastic material mounted on cross rods which interconnect chains at the sides of the conveyor belt, said first conveyor belt further including projections to engage and retain oily/tarry residue contaminants.

4. A ship according to claim 3 wherein said second conveyor belt comprises chains connected to trays carrying sponges made of plastic material, the arrangement being such that in operation of the ship, light fractions of oil will cling to the sponges which allow water to drain away.

5. A ship according to claim 4 wherein said means for removing and recovering contaminants includes first and second residue tanks for containing solvent and/or washing medium through which said first and second conveyor belts are respectively arranged to pass so that contaminants carried by the conveyor belts are removed therefrom by the solvent and/or washing medium and retained in the respective residue tanks.

6. A water-surface cleansing ship comprising
   a. a hull b. said hull having a longitudinal channel extending from an opening at the bow of the ship to an opening at the stern of the ship, through which channel at least surface water to be cleansed can be caused to flow when the ship is floating in the water, c. means for removing and recovering contaminants from the water when flowing through said channel, said means including d. a coarse mesh grill portably mounted in said channel near the bow opening and operative to remove large solid contaminants from the water passing therethrough, e. a first conveyor belt located aft of said grill and drive means for said first conveyor belt, said first belt projecting into said channel to pick up and remove from water in the channel contaminints inclusive of oily tarry residues which have passed through said coarse mesh grill, f. a second conveyor belt located aft of the first conveyor belt, and drive means for said second belt, said second belt projecting into said channel to pick up and remove oil from water in the channel, g. flow inducing means for causing water to flow through the channel including a paddle wheel mounted to project into the water in the channel, said paddle wheel being arranged with respect to the channel between the second conveyor and the stern opening, h. said hull further comprising self propulsion means, and i. flap means on said hull for cooperation with said bow and stern openings to open and close said channel.

7. A ship according to claim 6 including ballast means for varying the draft of the ship to vary the height of the channel and the bow and stern openings relative to the water level.

8. A ship according to claim 6, wherein the longitudinally extending channel at the bow opening extends substantially the full width of the ship, said channel reducing to a constant width over the main part of the length of the hull, the depth of the channel along the portion of constant width being greater than the depth of the channel at the bow opening.

9. A ship according to claim 6 including dredging equipment, fire-fighting equipment, a helicopter landing platform, salvage equipment, ship waste receiving and processing tanks, and/or oil/gas drilling rig servicing and fire-extinguishing equipment.

10. A ship according to claim 8 including a well constructed in the channel to enable divers, dredging equipment, and other equipment to be lowered from the interior of the ship into water when the ship is floating in the latter.

* * * * *